US010099548B1

(12) United States Patent
Tsumiyama et al.

(10) Patent No.: US 10,099,548 B1
(45) Date of Patent: Oct. 16, 2018

(54) UTILITY VEHICLE (71) Applicant: KAWASAKI JUKOGYO KABUSHIKI KAISHA, Hyogo (JP)

(72) Inventors: Yoshinori Tsumiyama, Hyogo (JP); Teruaki Yamamoto, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/465,991

(22) Filed: Mar. 22, 2017

(51) Int. Cl.
*B60K 11/08* (2006.01)
*B62D 25/08* (2006.01)
*F02M 35/16* (2006.01)

(52) U.S. Cl.
CPC ............ *B60K 11/08* (2013.01); *B62D 25/085* (2013.01); *F02M 35/164* (2013.01)

(58) Field of Classification Search
CPC ......... B60K 11/02; B60K 11/04; B60K 11/06; B60K 11/08; B62D 25/08; B62D 25/082; B62D 25/085; F02M 35/164
USPC ...................................... 180/68.1, 68.2, 68.3
See application file for complete search history.

(56) References Cited

U.S. PATENT DOCUMENTS

| | | | |
|---|---|---|---|
| 8,453,775 B2 * | 6/2013 | Belzile ................... | B60K 11/02 180/291 |
| 8,499,870 B2 * | 8/2013 | Nakamura ............ | F02M 35/048 180/68.3 |
| 9,333,846 B2 | 5/2016 | Yamamoto et al. | |
| 9,676,270 B2 * | 6/2017 | Tsuchihashi ........... | B60K 11/04 |
| 2008/0289896 A1 * | 11/2008 | Kosuge .................. | B60K 11/06 180/312 |

* cited by examiner

*Primary Examiner* — John D Walters
(74) *Attorney, Agent, or Firm* — Wenderoth, Lind & Ponack, L.L.P.

(57) ABSTRACT

A utility vehicle includes: an engine; an engine room in which the engine is contained and that has a front opening in a front face thereof and a rear opening in a rear face thereof; and an air intake duct that has an air inlet in a front part of a vehicle body and extends in a front-rear direction, the air intake duct guiding air from the air inlet to the front opening, in which the engine room includes a bottom plate and a left partition wall and a right partition wall that are provided on respective sides, in a vehicle width direction, of the engine and cover at least a crankcase part of the engine in side view.

4 Claims, 7 Drawing Sheets

UTILITY VEHICLE

BACKGROUND OF THE INVENTION

1. Field of the Invention

The present invention relates to a utility vehicle.

2. Description of the Related Art

Conventionally, in a utility vehicle, air is taken into an engine room in which an engine is contained through an opening provided in a lower side of the engine room, as described in U.S. Pat. No. 9,333,846.

SUMMARY OF THE INVENTION

However, it can be assumed that mud, water, foreign substances, and the like flow into the engine room through the opening provided in the lower side of the engine room. It is therefore necessary to take a measure to make it hard for these foreign substances to flow into the engine room in the utility vehicle.

In view of this, an object of the present invention is to provide a utility vehicle that makes it possible to suppress flow of a foreign substance and the like into an engine room.

In order to attain the above object, a utility vehicle according to the present invention includes: an engine; an engine room in which the engine is contained and that has a front opening in a front face thereof and a rear opening in a rear face thereof; and an air intake duct that has an air inlet in a front part of a vehicle body and extends in a front-rear direction, the air intake duct guiding air from the air inlet to the front opening, in which the engine room includes a bottom plate and a left partition wall and a right partition wall that are provided on respective sides, in a vehicle width direction, of the engine and cover at least a crankcase part of the engine in side view.

According to the configuration, air is taken into the engine room from the air inlet in a front part of the vehicle body through the front opening and is not taken into the engine room from a lower side thereof. This makes it possible to suppress flow of a foreign substance and the like into the engine room. The left partition wall and the right partition wall of the engine room form flow of air from the front opening toward the rear opening in the engine room. This allows less air to stay in the engine room. The left partition wall and the right partition wall of the engine room can block engine sound and block heat radiated from the engine.

The present invention preferably further includes the following configurations.

(1) The air inlet is supported by frames that support left and right fender covers for front wheels; and the air intake duct is formed by a center tunnel that extends forward and backward at a center in the vehicle width direction.

(2) A bracket for attachment of an auxiliary machine of the engine is attachable to each of the left partition wall and the right partition wall.

(3) A containing space in which a good is contained is formed between the left partition wall and a left outer plate of the utility vehicle and/or between the right partition wall and a right outer plate of the utility vehicle.

(4) A front end of the left partition wall and a front end of the right partition wall are each attached to an intermediate vertical frame that supports a seat frame;

a rear end of the left partition wall and a rear end of the right partition wall are each attached to a rear vertical frame that supports a cargo bed frame;

an upper end of the left partition wall and an upper end of the right partition wall are each attached to a seat frame that supports a seat; and a lower end of the left partition wall and a lower end of the right partition wall are each attached to a floor plate frame that supports a floor plate.

According to the configuration (1), in which the air inlet is supported by frames that support left and right fender covers, the air inlet can be provided at the center in the vehicle width direction in the front part of the vehicle body. Furthermore, a center tunnel extending forward and backward at the center in the vehicle width direction can be used as an air intake duct.

According to the configuration (2), the left partition wall and the right partition wall can be used for fixation of an auxiliary machine of the engine.

According to the configuration (3), a good can be contained in the containing space.

According to the configuration (4), the left partition wall and the right partition wall can be attached by using the vehicle body frame, and therefore the rigidity of the vehicle body frame can be improved by the left partition wall and the right partition wall.

In summary, according to the present invention, it is possible to provide a utility vehicle that makes it possible to suppress flow of a foreign substance and the like into an engine room.

DETAILED DESCRIPTION OF THE INVENTION

A utility vehicle according to an embodiment of the present invention will now be described below with reference to the accompanying drawings. A utility vehicle is a vehicle mainly for off-road traveling not only on a grass field, a gravel field, and a sandy field, but also on unpaved mountain road and forest road, a muddy road, and a rocky field. For convenience of description, it is assumed that a direction toward which the utility vehicle travels is a "front side" of the utility vehicle and parts thereof and that left and right, in a vehicle width direction, of a driver of the utility vehicle facing forward are "left and right" of the utility vehicle and the parts thereof.

[Overall Structure of Vehicle]

Figure 1:
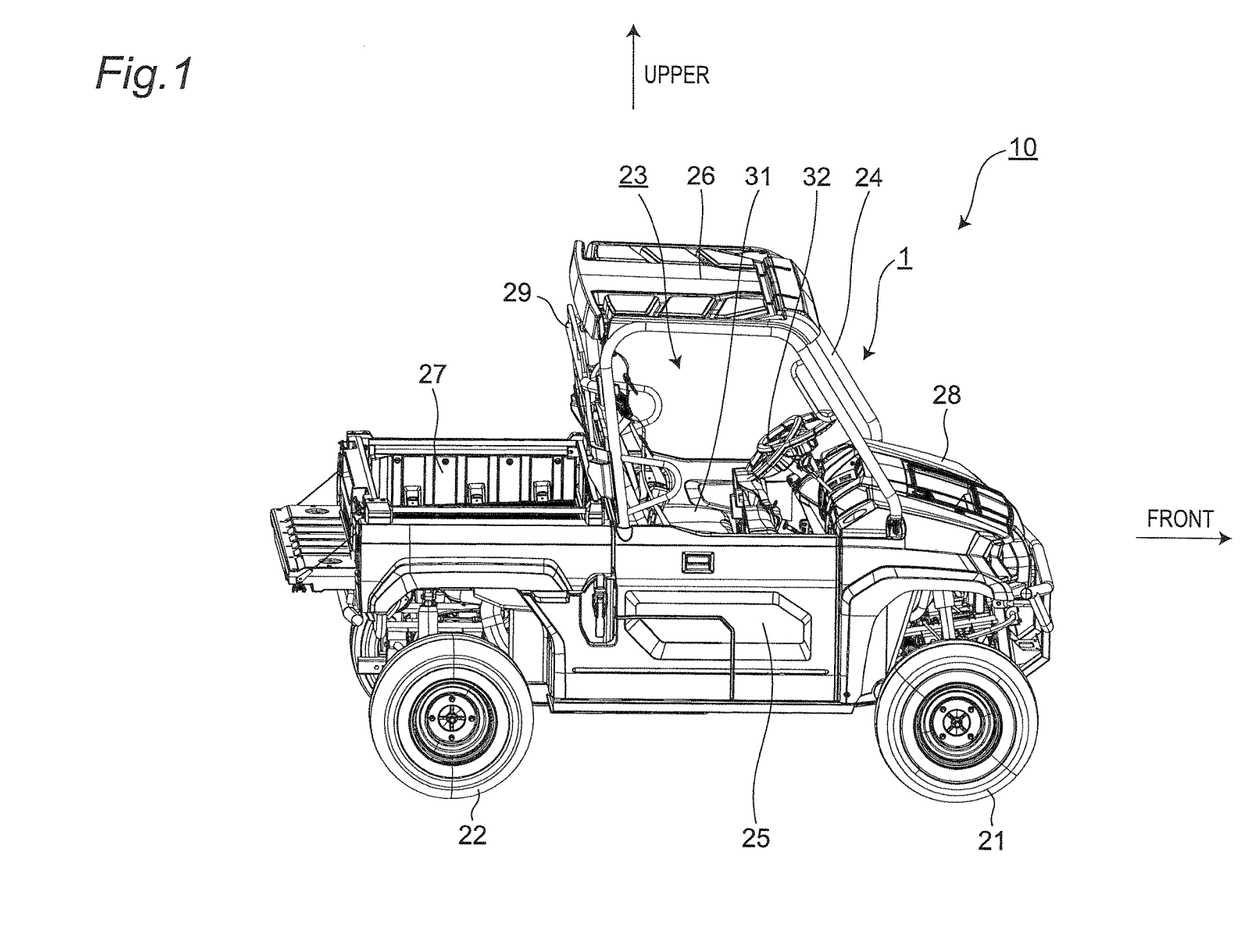
FIG. 1 is a perspective view of a utility vehicle according to an embodiment of the present invention.

FIG. 1 is a perspective view of a utility vehicle according to an embodiment of the present invention.

As illustrated in FIG. 1, a utility vehicle 10 includes a pair of left and right front wheels 21 on a front side of a body thereof, a pair of left and right rear wheels 22 on a rear side of the body, and a riding space (cabin) 23 between the front wheels 21 and the rear wheels 22. The riding space 23 is surrounded by a ROPS 24, a pair of left and right doors 25, and a top plate 26. The ROPS is an abbreviation of a rollover protective structure, and is part of a body frame 1. The top plate 26 is attached onto an upper end of the ROPS 24.

A cargo bed 27 is provided behind the riding space 23, and a bonnet 28 is provided ahead of the riding space 23. A screen 29 that serves as a partition between the cargo bed 27 and the riding space 23 is provided at a front end of the cargo bed 27.

A pair of left and right independent seats 31 are provided in the riding space 23. Operating units such as a steering wheel 32 and the like are provided ahead of the seats 31.

[Frame Structure]

Figure 2:
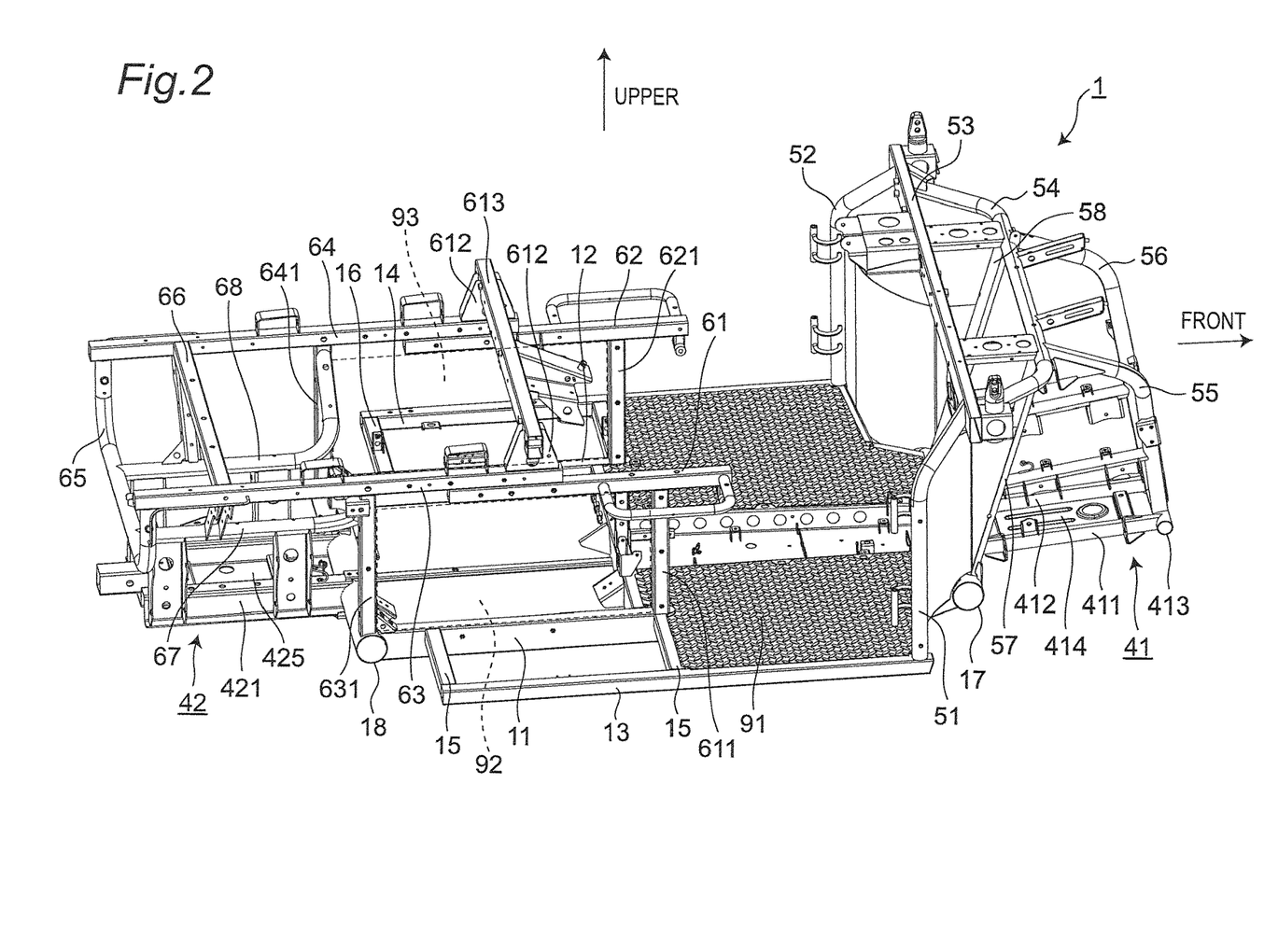
FIG. 2 is a perspective view of a body frame of the utility vehicle of FIG. 1.
Figure 3:
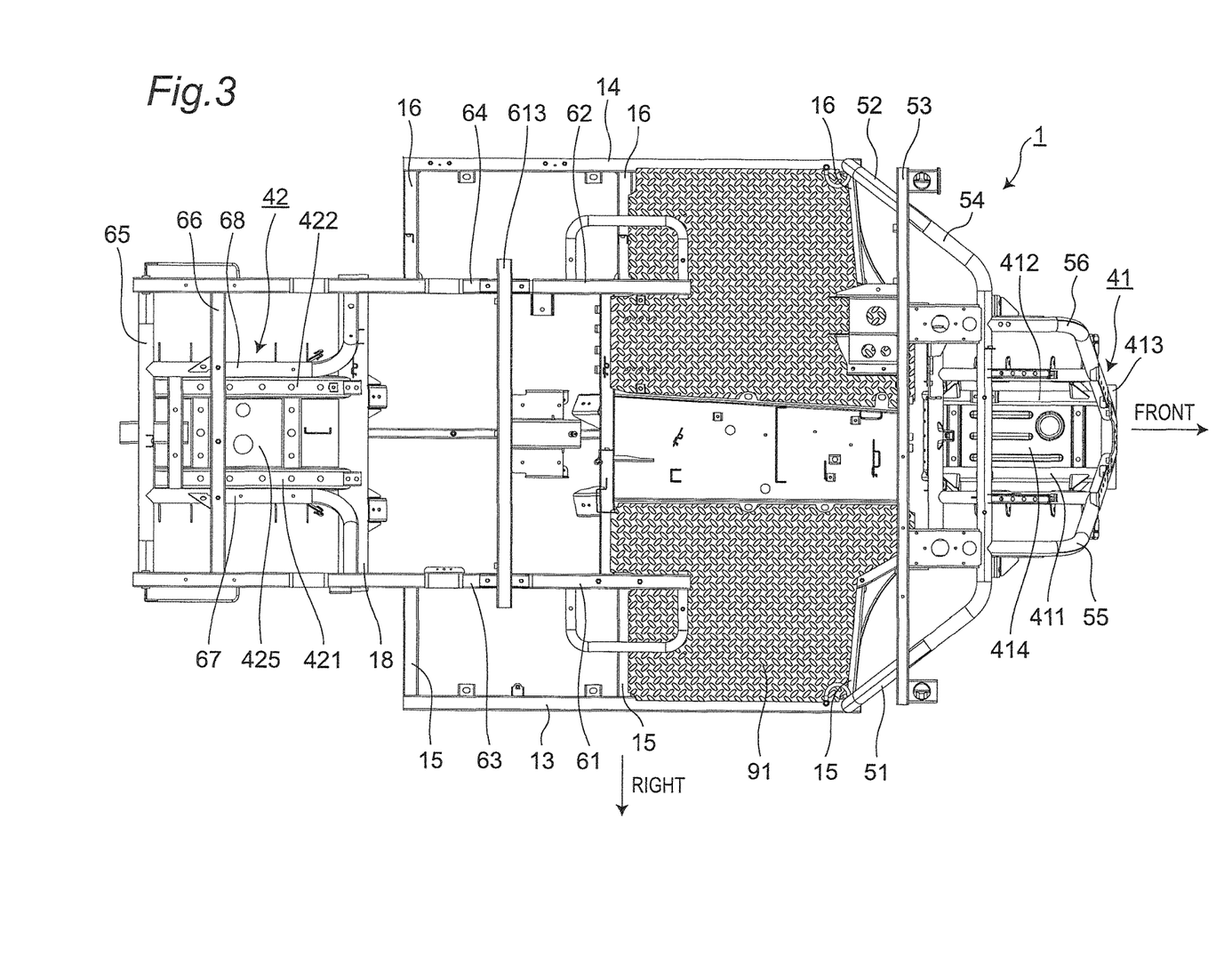
FIG. 3 is a top view of FIG. 2.
Figure 4:
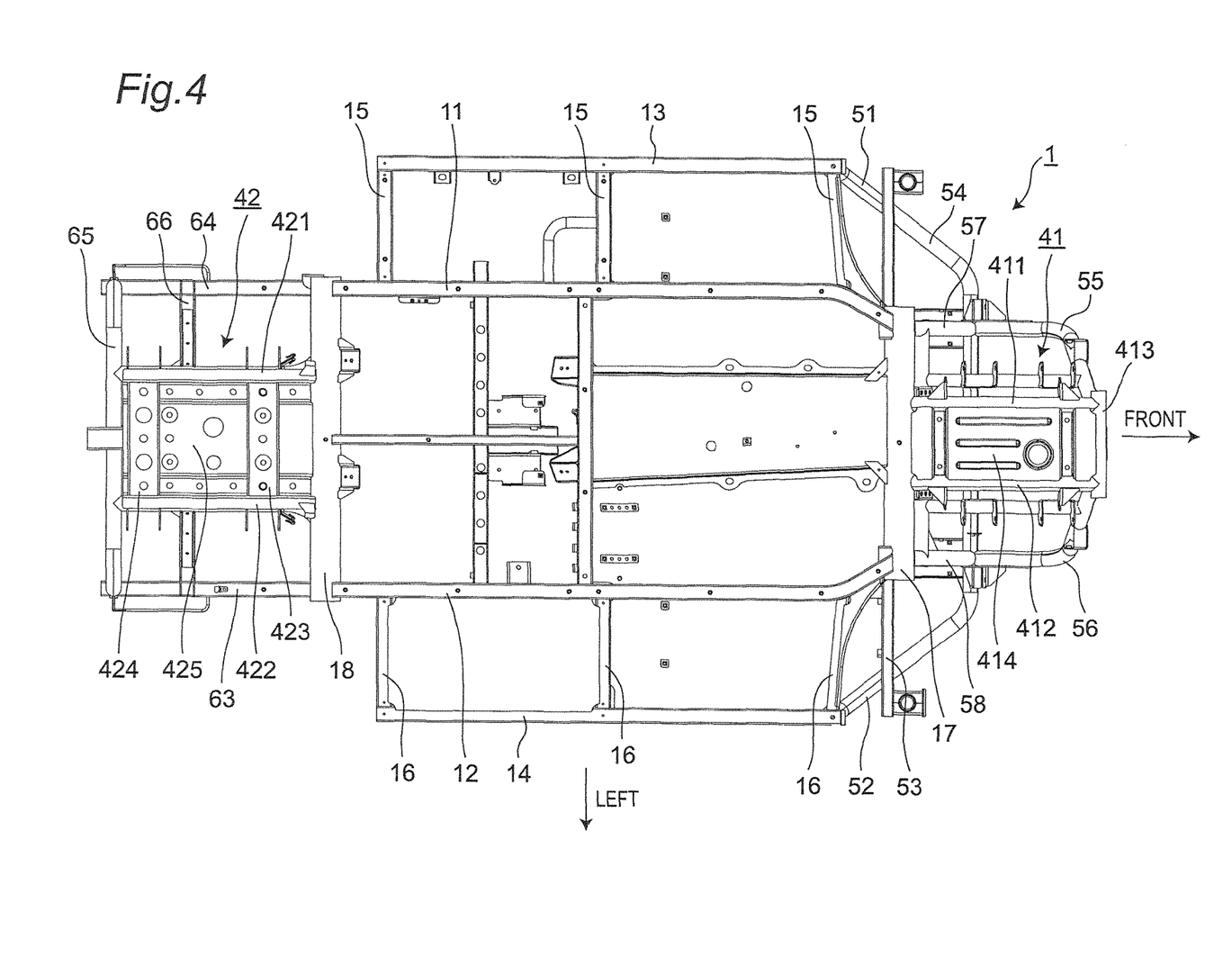
FIG. 4 is a bottom view of FIG. 2.
Figure 5:
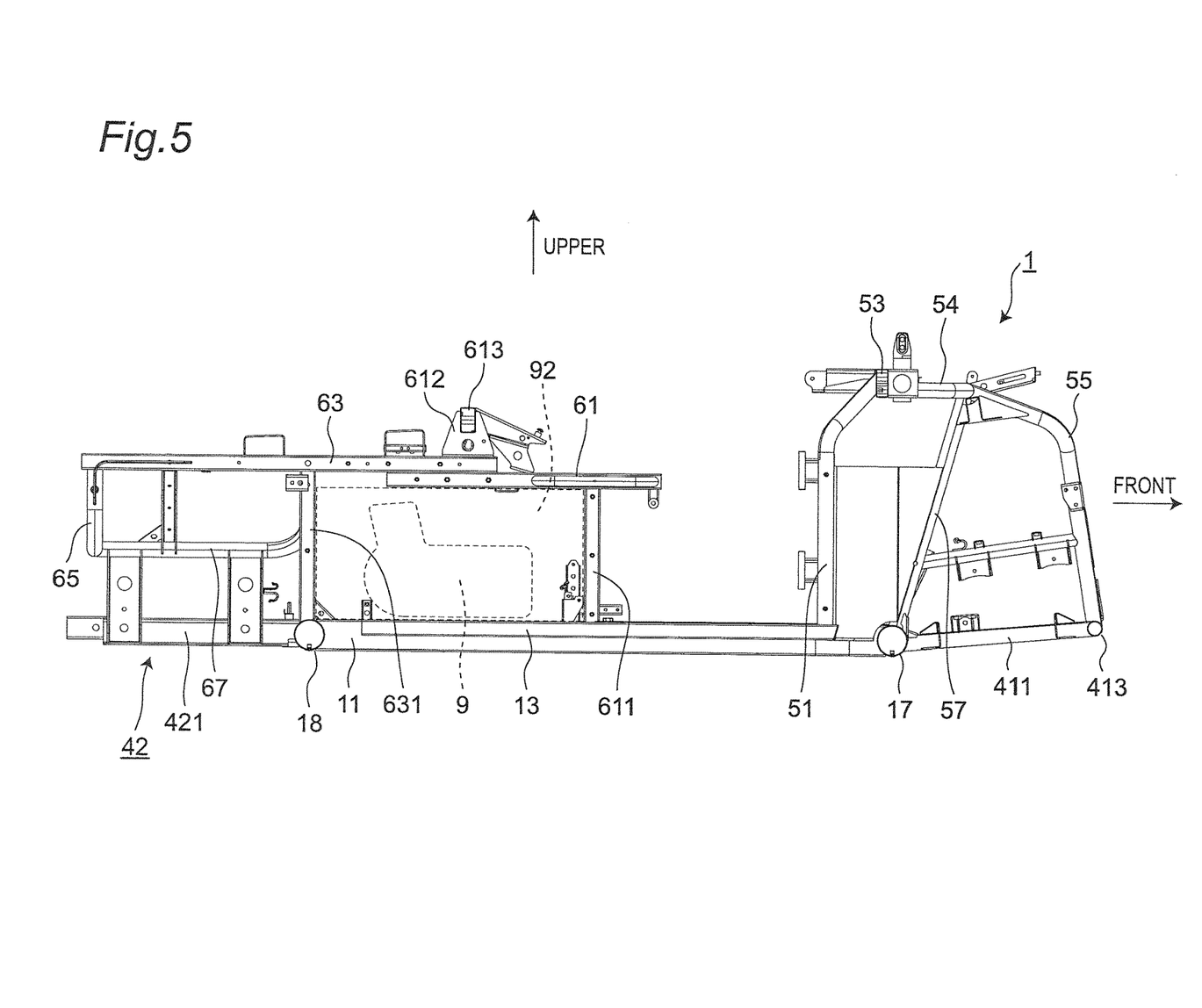
FIG. 5 is a right side view of FIG. 2.

FIG. 2 is a perspective view of the body frame 1 of the utility vehicle 10 of FIG. 1. FIG. 3 is a top view of FIG. 2, and FIG. 4 is a bottom view of FIG. 2. FIG. 5 is a right side view of FIG. 2. In FIGS. 2 to 5, the ROPS 24 of the body frame 1 is omitted.

As illustrated in FIGS. 2 to 5, the body frame 1 includes, in a bottom portion thereof, a pair of left and right floor plate frames (bottom first frame 11 and bottom second frame 12) that extend substantially horizontally in a front-rear direction and support a floor plate 91 and a pair of left and right bottom side frames 13 and 14 that are provided on outer sides, in a vehicle width direction, of the bottom first frame 11 and the bottom second frame 12, extend substantially horizontally in the front-rear direction, and support the floor plate 91. The bottom first frame 11 and the bottom second frame 12 are square pipe frames.

The bottom first frame 11 and the bottom side frame 13 are coupled to each other by a plurality of bottom cross frames 15 that extend substantially horizontally in the vehicle width direction (left-right direction) and that are provided at certain intervals in the front-rear direction.

A door frame 51 that supports the door 25 is coupled to a front end of the bottom side frame 13. The door frame 51 extends upward from the front end of the bottom side frame 13 and then extends inward in the vehicle width direction toward the upper side.

The bottom second frame 12 and the bottom side frame 14 are coupled to each other by a plurality of bottom cross frames 16 that extend substantially horizontally in the vehicle width direction (left-right direction) and that are provided at certain intervals in the front-rear direction.

A door frame 52 that supports the door 25 is coupled to a front end of the bottom side frame 14. The door frame 52 extends upward from the front end of the bottom side frame 14 and then extends inward in the vehicle width direction toward the upper side.

The body frame 1 includes a bottom front frame 17 that couples a front end of the bottom first frame 11 and a front end of the bottom second frame 12 and that extends substantially horizontally in a linear manner in the left-right direction. The bottom front frame 17 is a cylindrical pipe frame.

A ROPS mount front frame 53 is provided above the bottom front frame 17. The ROPS mount front frame 53 extends substantially horizontally in the left-right direction and couples an upper end of the door frame 51 and an upper end of the door frame 52, and the ROPS 24 is coupled to the ROPS mount front frame 53. A front U shape frame 54 having a U shape protruding toward the front side is coupled to a front portion of the ROPS mount front frame 53.

A front gear support member 41 that supports a gear box for front wheels from below is provided ahead of the bottom front frame 17. The front gear support member 41 includes a pair of left and right front gear support frames 411 and 412 that extend in the front-rear direction so as to be inclined upward toward the front side, a front gear support front frame 413 that couples front ends of the front gear support frames 411 and 412, and a front gear under guard 414 having a rectangular shape that couples intermediate portions of the front gear support frames 411 and 412. The front gear support frames 411 and 412 are joined to the bottom front frame 17 by welding.

A pair of left and right front curved frames 55 and 56 are provided on a front portion of the front U shape frame 54. The front curved frames 55 and 56 extend from the front portion of the front U shape frame 54 downward toward the front side and then extend downward and are coupled to the front gear support front frame 413.

The front U shape frame 54 is coupled to left and right ends of the bottom front frame 17 by a pair of left and right vertical frames 57 and 58 that extend downward and backward from a lower portion of the front U shape frame 54.

The body frame 1 includes a bottom rear frame 18 that couples a rear end of the bottom first frame 11 and a rear end of the bottom second frame 12 and that extends substantially horizontally in a linear manner in the left-right direction. The bottom rear frame 18 is a cylindrical pipe frame.

A rear gear support member 42 that supports a gear box for rear wheels from below is provided behind the bottom rear frame 18. The rear gear support member 42 includes a pair of left and right rear gear support frames 421 and 422 that extend substantially horizontally in the front-rear direction, a rear gear support intermediate frame 423 that couples intermediate portions, in the front-rear direction, of the rear gear support frames 421 and 422, a rear gear support rear frame 424 that couples rear portions, in the front-rear direction, of the rear gear support frames 421 and 422, and a rear gear under guard 425 having a rectangular shape that is supported by the rear gear support intermediate frame 423 and the rear gear support rear frame 424 from below. The rear gear support frames 421 and 422 are joined to the bottom rear frame 18 by welding.

A pair of left and right seat frames 61 and 62 that extend substantially horizontally in the front-rear direction and support the seats 31 are provided above the bottom first frame 11 and the bottom second frame 12. The seat frame 61 is coupled to the bottom first frame 11 by an intermediate vertical frame 611 extending in the top-bottom direction. The seat frame 62 is coupled to the bottom second frame 12 by an intermediate vertical frame 621 extending in the top-bottom direction.

A cargo bed frame (upper first frame 63) is provided above the seat frame 61. The cargo bed frame (upper first frame 63) is joined to an upper surface of a rear portion of the seat frame 61, extends substantially horizontally in the front-rear direction to a rear end of the vehicle body along the seat frame 61, and supports the cargo bed 27. A cargo bed frame (upper second frame 64) is provided above the seat frame 62. The cargo bed frame (upper second frame 64) is joined to an upper surface of a rear portion of the seat frame 62, extends substantially horizontally in the front-rear direction to a rear end of the vehicle body along the seat frame 62, and supports the cargo bed 27.

The upper first frame 63 is coupled to a right end of the bottom rear frame 18 by a rear vertical frame 631 extending in the top-bottom direction.

The upper second frame 64 is coupled to a left end of the bottom rear frame 18 by a rear vertical frame 641 extending in the top-bottom direction.

A ROPS mount rear frame 613 is provided above the upper first frame 63 and the upper second frame 64. The ROPS mount rear frame 613 extends substantially horizontally in the left-right direction and couples the upper first frame 63 and the upper second frame 64 via support members 612, and the ROPS 24 is coupled to the ROPS mount rear frame 613.

A rear end of the upper first frame 63 and a rear end of the upper second frame 64 are coupled by a rear U shape frame 65 having a U shape that extends in the left-right direction and protrudes downward. The upper first frame 63 and the upper second frame 64 are also coupled, at intermediate portions thereof in the front-rear direction, by a rear cross frame 66 that extends substantially horizontally in the left-right direction.

The rear vertical frame 631 and the rear U shape frame 65 are coupled by a rear L shape frame 67 having a substantially L shape that extends inward in the vehicle width direction and backward from an inner side surface, in the vehicle width direction, of the rear vertical frame 631.

The rear vertical frame 641 and the rear U shape frame 65 are coupled by a rear L shape frame 68 having a substantially L shape that extends inward in the vehicle width direction and backward from an inner side surface, in the vehicle width direction, of the rear vertical frame 641.

[Structure of Engine Room and Surroundings Thereof]

Figure 6:
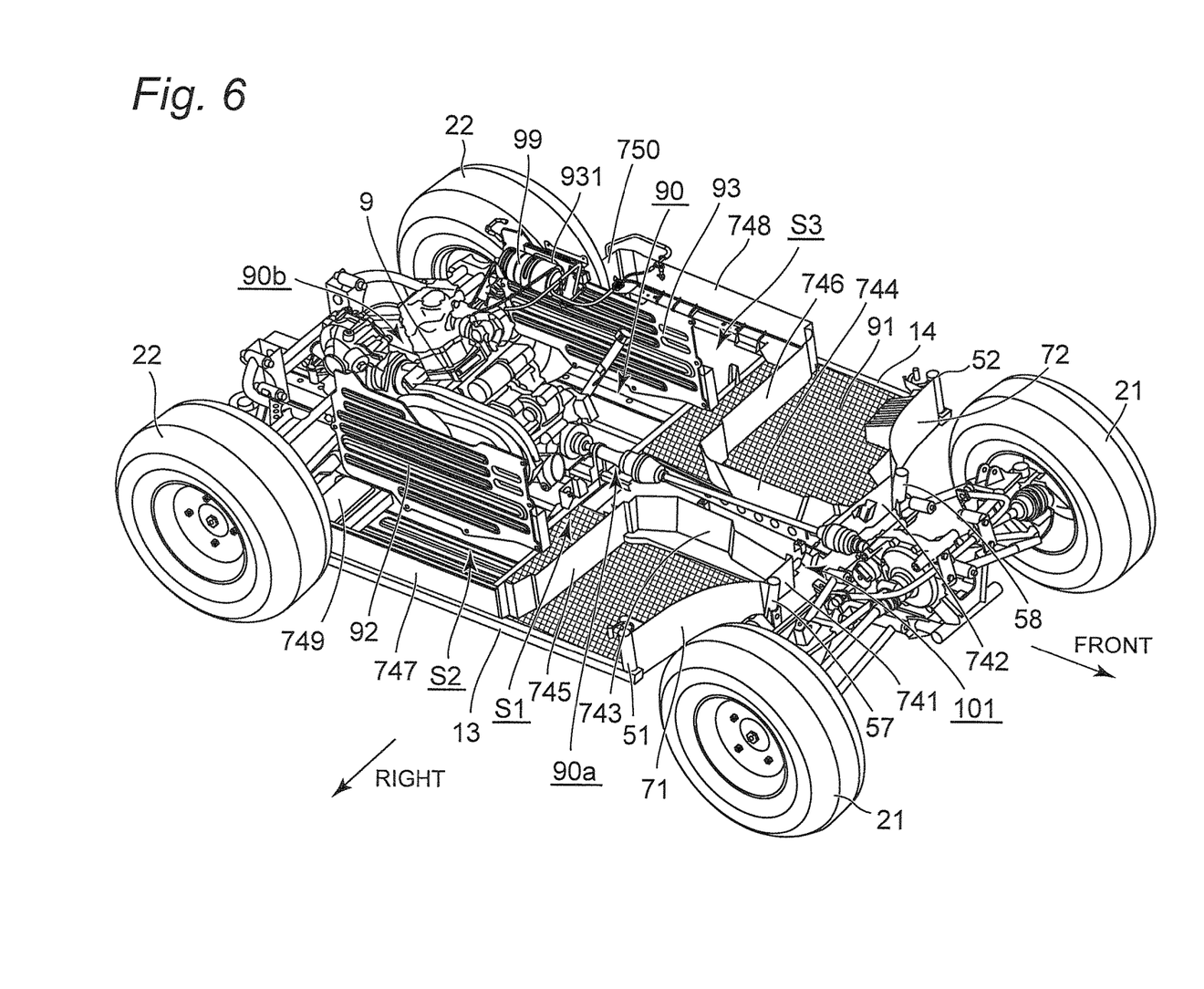
FIG. 6 is a front perspective view of an engine room and surroundings thereof.
Figure 7:
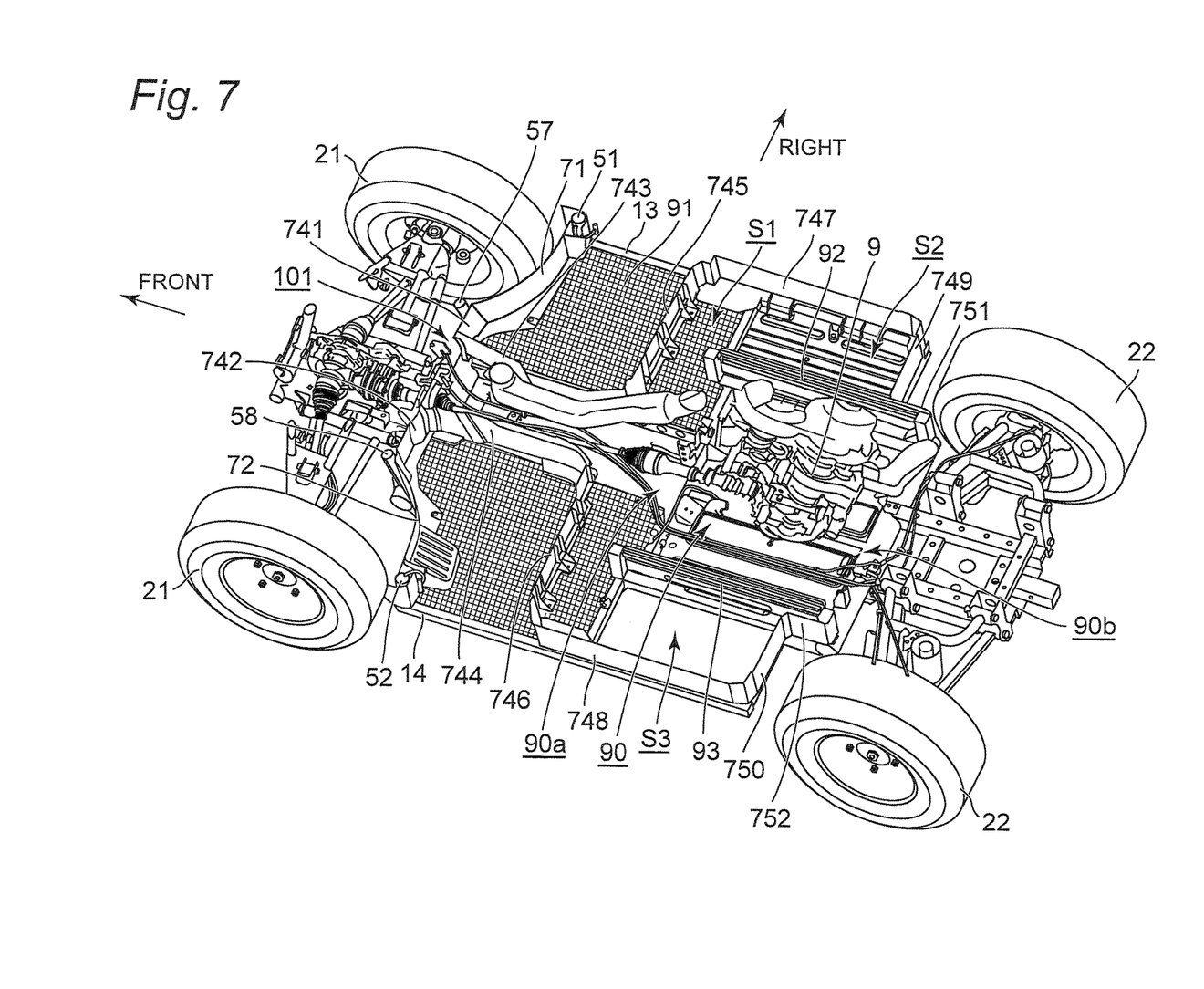
FIG. 7 is a rear perspective view of the engine room and surroundings thereof.

FIG. 6 is a front perspective view illustrating an engine room and surroundings thereof taken along a specific horizontal cross section, and FIG. 7 is a rear perspective view illustrating the engine room and surroundings thereof taken along a specific horizontal cross section. As illustrated in FIGS. 6 and 7, an engine 9 of the utility vehicle 10 is disposed behind the floor plate 91 so as to be located in a central part in the vehicle width direction. The engine 9 is contained in an engine room 90. The engine room 90 has a front opening 90a in a front face thereof and a rear opening 90b in a rear face thereof.

The utility vehicle 10 has an air inlet 101 in a front part of the vehicle body. The air inlet 101 is formed by a right front panel 741 that is supported by the front vertical frame 57 that supports a fender cover for right front wheel 71 and a left front panel 742 that is supported by the front vertical frame 58 that supports a fender cover for left front wheel 72.

The fender covers for front wheels 71 and 72 are provided as a pair of left and right fender covers. The fender cover for front wheel 71 is located behind the front wheel 21, and a front end thereof is attached to the front vertical frame 57 and a rear end thereof is attached to the door frame 51. The fender cover for front wheel 72 is located behind the front wheel 21, and a front end thereof is attached to the front vertical frame 58 and a rear end thereof is attached to the door frame 52.

The fender cover for front wheel 71 and the fender cover for front wheel 72 are provided so as to be symmetrical with respect to a central line in the vehicle width direction of the vehicle body in top view.

A right front vertical panel 743 extending in the front-rear direction is attached to a left end of the right front panel 741, and a left front vertical panel 744 extending in the front-rear direction is attached to a right end of the left front panel 742. The right front vertical panel 743 and the left front vertical panel 744 form a center tunnel that extends forward and backward at the center in the vehicle width direction, and this center tunnel serves as an air intake duct that guides air from the air inlet 101 into the front opening 90a.

A right intermediate lateral panel 745 that extends rightward in the vehicle width direction to the bottom side frame 13 is attached to a rear end of the right front vertical panel 743, and a left intermediate lateral panel 746 that extends leftward in the vehicle width direction to the bottom side frame 14 is attached to a rear end of the left front vertical panel 744. A right rear vertical panel 747 that extends backward on the bottom side frame 13 to a rear end of the bottom side frame 13 is attached to a right end of the right intermediate lateral panel 745, and a left rear vertical panel 748 that extends backward on the bottom side frame 14 to a rear end of the bottom side frame 14 is attached to a left end of the left intermediate lateral panel 746.

A right rear lateral panel 749 that extends leftward in the vehicle width direction on the bottom cross frames 15 to the bottom first frame 11 is attached to a rear end of the right rear vertical panel 747, and a left rear lateral panel 750 that extends rightward in the vehicle width direction on the bottom cross frames 16 to the bottom second frame 12 is attached to a rear end of the left rear vertical panel 748. A right rear end panel 751 that extends backward on the bottom first frame 11 to the rear vertical frame 631 is attached to a left end of the right rear lateral panel 749, and a left rear end panel 752 that extends backward on the bottom second frame 12 to the rear vertical frame 641 is attached to a right end of the left rear lateral panel 750.

The right intermediate lateral panel 745, the left intermediate lateral panel 746, the right rear vertical panel 747, the left rear vertical panel 748, the right rear lateral panel 749, the left rear lateral panel 750, the right rear end panel 751, and the left rear end panel 752 form a space S1, and air that flows into the space S1 from the air intake duct is discharged backward from the rear opening 90b of the engine room 90.

As illustrated in FIGS. 5 through 7, the engine room 90 is provided in the space S1 and includes the floor plate 91 and a right partition wall 92 and a left partition wall 93 that are provided on respective sides of the engine 9 in the vehicle width direction and cover at least a crankcase part of the engine 9 in side view.

To the right partition wall 92 and the left partition wall 93, a bracket for attachment of an auxiliary machine of the engine 9 is attachable. In the present embodiment, a bracket 931 for attachment of a canister 99 is provided on the left partition wall 93, and the canister 99 is attached to the left partition wall 93 with the bracket 931 interposed therebetween.

A front end of the right partition wall 92 is attached to the intermediate vertical frame 611 that supports the seat frame 61, and a rear end of the right partition wall 92 is attached to the rear vertical frame 631 that supports the cargo bed frame (upper first frame 63). An upper end of the right partition wall 92 is attached to the seat frame 61 that supports the seat 31, and a lower end of the right partition wall 92 is attached to the floor plate frame (bottom first frame 11) that supports the floor plate 91.

A front end of the left partition wall 93 is attached to the intermediate vertical frame 621 that supports the seat frame 62, and a rear end of the left partition wall 93 is attached to the rear vertical frame 641 that supports the cargo bed frame (upper second frame 64). An upper end of the left partition wall 93 is attached to the seat frame 62 that supports the seat 31, and a lower end of the left partition wall 93 is attached to the floor plate frame (bottom second frame 12) that supports the floor plate 91.

Although the panels illustrated in FIG. 6 and the panels, the right partition wall 92, the left partition wall 93 illustrated in FIG. 7 are cut on a specific horizontal cross section in an intermediate part in the top-bottom direction in order to provide easy view of an interior space of the vehicle body, the right partition wall 92 and the left partition wall 93 are not cut on the specific horizontal cross section in FIG. 6. As described above, the upper ends of the right partition wall 92 and the left partition wall 93 are attached to the seat frames 61 and 62, respectively, so that the positions of upper ends of the panels 741 through 752 substantially match in the top-bottom direction those of the upper ends of the right partition wall 92 and the left partition wall 93.

A containing space S2 in which a good is contained is formed between the right partition wall 92 and the right rear vertical panel 747 that serves as a right outer plate of the utility vehicle 10. A containing space S3 in which a good is contained is formed between the left partition wall 93 and the left rear vertical panel 748 that serves as a left outer plate of the utility vehicle 10.

According to the utility vehicle 10 configured as above, the following effects can be produced.

(1) Air is taken into the engine room 90 from an air inlet in a front part of the vehicle body through the front opening 90a and is not taken into the engine room 90 from a lower side thereof. This allows less foreign substance and the like to flow into the engine room 90.

(2) The right partition wall 92 and the left partition wall 93 of the engine room 90 form flow of air from the front opening 90a toward the rear opening 90b in the engine room 90. This allows less air to stay in the engine room 90.

(3) The right partition wall 92 and the left partition wall 93 of the engine room 90 can block engine sound and block heat radiated from the engine 9. In order to accomplish the function of blocking sound and heat from the engine 9, it is only necessary that the right partition wall 92 and the left partition wall 93 cover at least the crankcase part of the engine 9 in side view.

(4) Since the air inlet is supported by the front vertical frames 57 and 58 that support the left and right fender covers 71 and 72, respectively, the air inlet can be provided at the center in the vehicle width direction in the front part of the vehicle body. Furthermore, the center tunnel that is formed by the right front vertical panel 743 and the left front vertical panel 744 and extends forward and backward at the center in the vehicle width direction can be used as an air intake duct.

(5) Brackets 921 and 931 for attaching the auxiliary machine 99 of the engine 9 are attachable to the right partition wall 92 and the left partition wall 93, respectively, and therefore the right partition wall 92 and the left partition wall 93 can be used for fixation of the auxiliary machine 99 of the engine 9.

(6) The containing space S2 in which a good is contained is formed between the right partition wall 92 and the right rear vertical panel 747 serving as a right outer plate of the utility vehicle 10, and the containing space S3 in which a good is contained is formed between the left partition wall 93 and the left rear vertical panel 748 serving as a left outer plate of the utility vehicle 10. This makes it possible to contain a good in the containing spaces S2 and S3.

(7) The front end, rear end, upper end, and lower end of the right partition wall 92 are attached to the vehicle body frame, and the front end, rear end, upper end, and lower end of the left partition wall 93 are attached to the vehicle body frame. Since the right partition wall 92 and the left partition wall 93 can be attached by using the vehicle body frame, the rigidity of the vehicle body frame can be improved by the right partition wall 92 and the left partition wall 93.

In the above embodiment, the right rear end panel 751 and the left rear end panel 752 are provided. However, the right rear end panel 751 and the left rear end panel 752 may be omitted by attaching a left end of the right rear lateral panel 749 to the right partition wall 92 and attaching a right end of the left rear lateral panel 750 to the left partition wall 93.

In the above embodiment, the containing space S2 is provided on the right of the right partition wall 92, and the containing space S3 is provided on the left of the left partition wall 93. Alternatively, a containing space may be provided only on an outer side, in the vehicle width direction, of any one of the right partition wall 92 and the left partition wall 93.

In the above embodiment, the right partition wall 92 and the left partition wall 93 cover at least the crankcase part of the engine 9 in side view. However, the right partition wall 92 and the left partition wall 93 preferably cover the whole cylinder block of the engine 9.

In the above embodiment, the canister 99 is attached to the left partition wall 93 with the bracket 931 interposed therebetween. Alternatively, a canister may be attached to the right partition wall 92 with a bracket interposed therebetween. Alternatively, another engine auxiliary machine may be attached to the right partition wall 92 and the left partition wall 93 with a bracket interposed therebetween.

Various modifications and changes can be made without departing from the spirit and scope of the present invention described in the claims.

The invention claimed is:

1. A utility vehicle comprising:
   an engine;
   an engine room in which the engine is contained, the engine room having a front opening in a front face thereof and a rear opening in a rear face thereof; and
   an air intake duct that has an air inlet in a front part of a vehicle body and extends in a front-rear direction, the air intake duct being configured to guide air from the air inlet to the front opening,
   wherein the engine room includes a bottom plate and a left partition wall and a right partition wall that are provided on respective sides, in a vehicle width direction, of the engine and cover at least a crankcase part of the engine in side view, and
   a containing space, in which a good can be contained, is formed between the left partition wall and a left outer plate of the utility vehicle and/or between the right partition wall and a right outer plate of the utility vehicle.

2. The utility vehicle according to claim 1, wherein:
   the air inlet is supported by frames that support left and right fender covers for front wheels; and
   the air intake duct is formed by a center tunnel that extends forward and backward at a center in the vehicle width direction.

3. The utility vehicle according to claim 1, wherein a bracket for attachment of an auxiliary machine of the engine is attachable to each of the left partition wall and the right partition wall.

4. The utility vehicle according to claim 1, wherein
   a front end of the left partition wall and a front end of the right partition wall are each attached to an intermediate vertical frame that supports a seat frame;
   a rear end of the left partition wall and a rear end of the right partition wall are each attached to a rear vertical frame that supports a cargo bed frame;
   an upper end of the left partition wall and an upper end of the right partition wall are each attached to the seat frame that supports a seat; and
   a lower end of the left partition wall and a lower end of the right partition wall are each attached to a floor plate frame that supports a floor plate.

* * * * *